(12) United States Patent
Maheshwari et al.

(10) Patent No.: US 12,240,679 B2
(45) Date of Patent: Mar. 4, 2025

(54) BIODEGRADABLE PACKAGING WITH INTEGRATED HEATING SYSTEM

(71) Applicant: Accenture Global Solutions Limited, Dublin (IE)

(72) Inventors: Aditi Maheshwari, San Francisco, CA (US); Katherine Wei Song, Albany, CA (US); Eric Michael Gallo, Moretown, VT (US)

(73) Assignee: Accenture Global Solutions Limited, Dublin (IE)

( * ) Notice: Subject to any disclaimer, the term of this patent is extended or adjusted under 35 U.S.C. 154(b) by 739 days.

(21) Appl. No.: 17/505,705

(22) Filed: Oct. 20, 2021

(65) Prior Publication Data
US 2023/0029537 A1    Feb. 2, 2023

Related U.S. Application Data

(60) Provisional application No. 63/228,429, filed on Aug. 2, 2021.

(51) Int. Cl.
*B65D 81/34*        (2006.01)
*B65D 65/46*        (2006.01)
(Continued)

(52) U.S. Cl.
CPC ....... *B65D 81/3476* (2013.01); *B65D 65/466* (2013.01); *H05B 3/12* (2013.01);
(Continued)

(58) Field of Classification Search
CPC ...... H05B 3/12; H05B 3/34; H05B 2203/013; B65D 65/466; B65D 81/3476; C09D 5/24; B82Y 30/00
See application file for complete search history.

(56) References Cited

U.S. PATENT DOCUMENTS

| | | | |
|---|---|---|---|
| 3,573,430 A | | 4/1971 | Eisler |
| 4,933,534 A | * | 6/1990 | Cunningham ..... B65D 81/3476 |
| | | | 219/521 |

(Continued)

FOREIGN PATENT DOCUMENTS

| | | |
|---|---|---|
| CN | 112690515 | 4/2021 |
| WO | WO 2020/230065 | 11/2020 |

OTHER PUBLICATIONS

An et al., "Thermorph: Democratizing 4D Printing of Self-Folding Materials and Interfaces," Presented at Proceedings of the 2018 CHI Conference on Human Factors in Computing Systems, Montreal, Quebec, Canada, Apr. 21-26, 2018; CHI '18, Apr. 2018, 260:1-12.

(Continued)

*Primary Examiner* — Brian W Jennison
(74) *Attorney, Agent, or Firm* — Polsinelli PC

(57) ABSTRACT

Packaging devices such as bags, pouches, envelops, containers, and the like, can include an integrated heating system. The packaging devices described herein have multiple potential uses such as for the containment and heating of single-serving meals, drinks, massage oils, masks, body wax, anti-wrinkle eye creams, and the like, to be heated on the go. The packaging devices described herein can also be used for instant heating of food and/or beverages for backcountry use. In some embodiments, the packaging devices use fibrous natural materials (e.g., leaf skeletons and soft biomaterials like chitosan) along with silver nanowires to create completely biodegradable, and reusable self-heating packaging.

12 Claims, 3 Drawing Sheets

(51) Int. Cl.
 *B82Y 30/00* (2011.01)
 *C09D 5/24* (2006.01)
 *H05B 3/12* (2006.01)
 *H05B 3/34* (2006.01)

(52) U.S. Cl.
 CPC .............. *H05B 3/34* (2013.01); *B82Y 30/00* (2013.01); *C09D 5/24* (2013.01); *H05B 2203/013* (2013.01)

(56) References Cited

U.S. PATENT DOCUMENTS

| | | | | |
|---|---|---|---|---|
| 6,010,771 | A * | 1/2000 | Isen ...................... | G01V 15/00 428/209 |
| 6,384,387 | B1 * | 5/2002 | Owens .................... | H05B 3/34 219/601 |
| 2004/0137202 | A1 * | 7/2004 | Hamilton ............... | B65D 81/24 428/174 |
| 2016/0164171 | A1 * | 6/2016 | Lai .......................... | H01B 1/04 427/122 |

OTHER PUBLICATIONS

Clara-Davis.com [online], "Thermo-Chro-Mico Top," 2018, retrieved on Mar. 24, 2022, retrieved from URL<https://clara-davis.com/albums/thermo-chro-mico-top/>, 1 page.

CMU.edu [online], "4DMesh: 4D Printing Morphing Non-Developable Mesh Surfaces. 2017-2018," upon information and belief, available no later than Aug. 2, 2021, retrieved on Mar. 24, 2022, retrieved from URL<https://www.morphingmatter.cs.cmu.edu/projects/4dmesh>, 6 pages.

Elsayes et al., "Plant-Based Biodegradable Capacitive Tactile Pressure Sensor Using Flexible and Transparent Leaf Skeletons as Electrodes and Flower Petal as Dielectric Layer," Advanced Sustainable Systems, May 8, 2020, 4(9):2000056, 9 pages.

Guerchouche et al., "Conductive polymer based antenna for wireless green sensors applications," Microelectronic Engineering, Oct. 5, 2017, 182:46-52.

Kaimoto et al., "ExpandFab: Fabricating Objects Expanding and Changing Shape with Heat," Presented at Proceedings of the Fourteenth International Conference on Tangible, Embedded, and Embodied Interaction, Sydney, NSW, Australia, Feb. 9-12, 2020; TEI '20, Feb. 2020, 153-164.

Kao et al., "SkinMorph: Texture-Tunable on-Skin Interface Through Thin, Programmable Gel," Presented at Proceedings of the 2018 ACM International Symposium on Wearable Computers, New York, NY, USA, Oct. 8-12, 2008; ISWC'18, Oct. 2018, 196-203.

Loomia.com [online], "How to Make Color-Changing Wall Art," Jan. 7, 2021, retrieved on Mar. 24, 2022, retrieved from URL<https://www.loomia.com/packspartstutorials/color-changing-wall-art-activated-by-heat>, 15 pages.

Nouryon.com [online], "Expancel® microspheres: Blowing agent and lightweight filler in one, " available on or before Jan. 17, 2021 via Internet Archive: Wayback Machine URL<https://web.archive.org/web/20210117212927/https://www.nouryon.com/produ cts/expancel-microspheres/>, retrieved on Mar. 24, 2022, retrieved from URL<https://www.nouryon.com/products/expancel-microspheres/>, 12 pages.

Pan et al., "Sustainable production of highly conductive multilayer graphene ink for wireless connectivity and IoT applications," Nature Communications, Dec. 5, 2018, 9:5197, 10 pages.

Ramadhan et al., "Surface-functionalized silver nanowires on chitosan biopolymers for highly robust and stretchable transparent conducting films," Materials Research Letters, Jan. 6, 2019, 7(3):124-130.

ScienceDaily.com [online], "Wearable wireless devices: Low cost radio frequency antenna printed with graphene ink," May 15, 2015, retrieved on Mar. 24, 2022, retrieved from URL<https://www.sciencedaily.com/releases/2015/05/150515174955.htm>, 4 pages.

Sharma et al., "Flexible biodegradable transparent heaters based on fractal-like leaf skeletons," NPJ Flexible Electronics, Oct. 15, 2020, 4:27, 8 pages.

Sun et al., "FabricFit: Transforming Form-Fitting Fabrics," Presented at Proceedings of the 33rd Annual ACM Symposium on User Interface Software and Technology, Virtual Event USA, Oct. 20-23, 2020; UIST '20 Adjunct, Oct. 2020, 99-101.

TechBriefs.com [online], "4D Printing of Morphing Structures," Feb. 1, 2021, retrieved on Mar. 24, 2022, retrieved from URL<https://www.techbriefs.com/component/content/article/tb/pub/techbriefs/manufacturing-prototyping/38494>, 5 pages.

Wang et al., "4DMesh: 4D Printing Morphing Non-Developable Mesh Surfaces," Presented at Proceedings of the 31st Annual ACM Symposium on User Interface Software and Technology, Berlin, Germany, Oct. 14-17, 2018; UIST '18, Oct. 2018, 623-635.

Yang et al., "Meter-scale transparent conductive circuits based on silver nanowire networks for rigid and flexible transparent light-emitting diode screens," Optical Materials Express, Nov. 4, 2019, 9(12):4483-4496.

Extended Search Report in European Appln. No. 22187811.9, dated Dec. 6, 2022, 10 pages.

Koivikko et al., "Biodegradable, Flexible and Transparent Tactile Pressure Sensor Based on Rubber Leaf Skeletons," IEEE Sensors Journal, May 10, 2021, 22(12):11241-11247.

\* cited by examiner

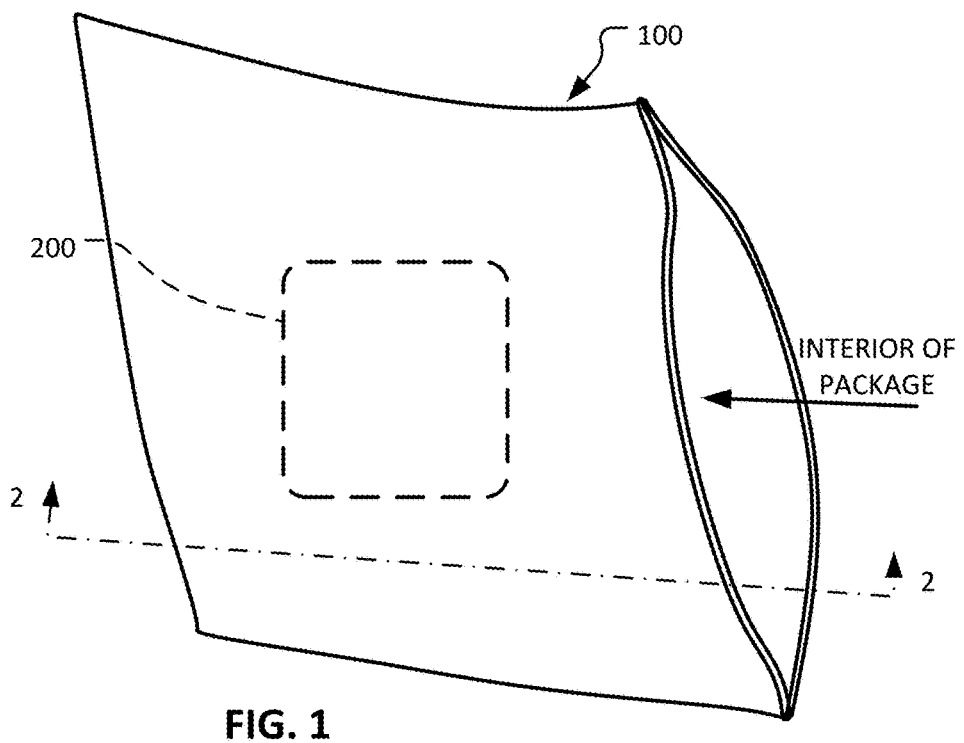
FIG. 1
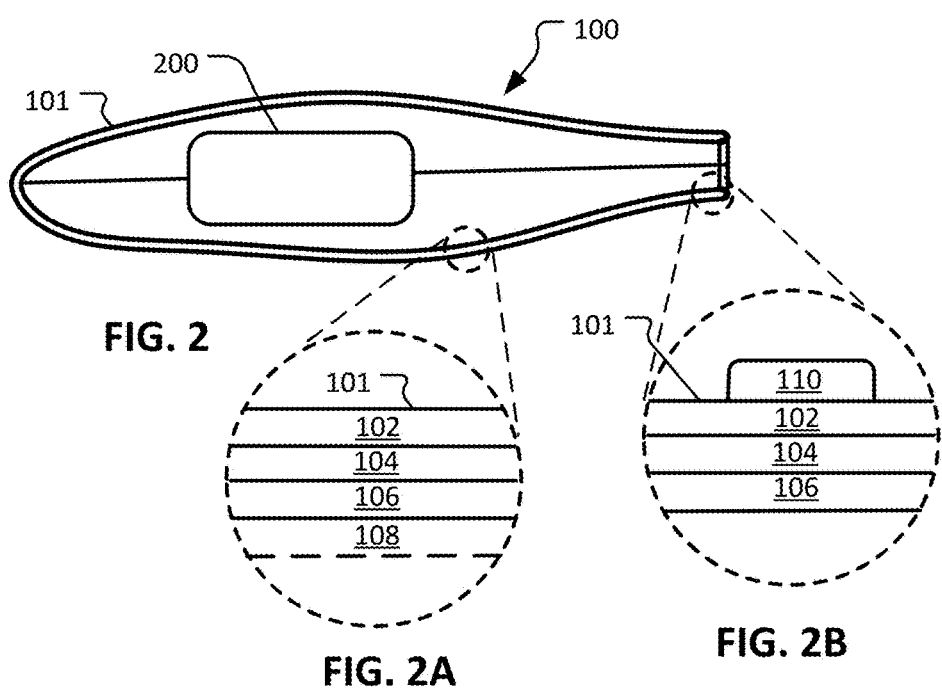
FIG. 2
FIG. 2A
FIG. 2B

BIODEGRADABLE PACKAGING WITH INTEGRATED HEATING SYSTEM

CROSS-REFERENCE TO RELATED APPLICATIONS

This application claims the benefit of U.S. Provisional Application Ser. No. 63/228,429, filed Aug. 2, 2021. The disclosure of the prior application is considered part of (and is incorporated by reference in) the disclosure of this application.

TECHNICAL FIELD

This disclosure generally relates to articles such as packaging devices. The packaging devices can include form factors such as bags, pouches, envelops, and the like, and can include an integrated heating system.

BACKGROUND

Some types of self-heating package devices currently exist. One type utilizes an exothermic chemical reaction (i.e., heat is released) that is triggered when a user exposes water, air, or other reactants to an initially-sealed packet or sub-compartment containing chemical reactants. Another type relies on resistive (Joule) heating by incorporating wires and usually a rechargeable portable battery into the body of the packaging. The package heats when the user activates the electrical current. However, such self-heating package devices tend to have shortcomings regarding aspects such as, but not limited to, bulkiness, temperature controllability, and environmental sustainability.

SUMMARY

In general, this disclosure describes packaging devices (e.g., low-profile packaging devices) such as bags, pouches, envelops, containers, and the like, that include an integrated heating system. The packaging devices described herein have multiple potential uses such as, but not limited to, single-serving meals, drinks, massage oils, masks, body wax, anti-wrinkle eye creams, and the like, to be heated on the go. The packaging devices described herein can also be used for instant heating of food and/or beverages for backcountry use.

The packaging devices and methods described herein may be used to provide one or more of the following optional benefits and advantages. First, the packaging devices described herein are reusable. That is, unlike existing packaging devices that use an exothermic chemical reaction, the heating systems of the packaging devices described herein can be used multiple times. Accordingly, the packaging devices described herein generate less waste and can have a lower overall cost in comparison to existing packaging devices.

Second, in some embodiments the packaging devices described herein include an opening to the interior of the package that is configured to be self-sealing. In some such embodiments, the seal is advantageously activated by the heating process.

Third, in some embodiments the packaging devices described herein include a temperature indicator. For example, in some embodiments thermochromic inks or other temperature-sensitive visual elements may be used on the outside of the packaging to indicate when the interior product is heated.

Fourth, all parts of the packaging devices described herein are biodegradable. Consequently, the packaging devices described herein do not contribute to landfill or include electronic components that contain highly toxic materials and require hazardous chemicals and gases to process. Accordingly, while the packaging devices described herein are reusable, when the packaging devices become soiled or worn beyond recovery they can be discarded in an environmentally responsible manner.

Fifth, in some embodiments the packaging devices described herein are advantageously configured for interfacing with a separate inductive power supply. Accordingly, the packaging devices described herein are advantageously lightweight and/or flexible, making them highly portable.

In one aspect, this disclosure is directed to a packaging device. The packaging device includes a multi-layer material configured to define an interior space and an opening to the interior space. At least a portion of the multi-layer material includes an inner layer made of a first biodegradable material, an outer layer made of a second biodegradable material, and a heating element layer encapsulated between the inner and outer layers. The heating element layer is biodegradable and provides resistive heating to the interior space when supplied with electrical power from a power source.

Such a packaging device may optionally include one or more of the following features. The packaging device may also include a seal material disposed adjacent to the opening. The seal material may be configured to activate in response to heating from the heating element layer and to provide sealing of the opening. The power source may be an onboard battery electrically connected to the heating element layer. The packaging device may also include a coil electrically connected to the heating element layer and configured for inductively coupling with an external power source to provide the electrical power to the heating element layer. In some embodiments, the coil comprises chitosan and sliver nanowires. In particular embodiments, the coil comprises a printed biodegradable electrically-conductive ink. In some embodiments, an entirety of the packaging device is biodegradable. The heating element layer may be made of one or more leaf skeletons. The one or more leaf skeletons may be coated with silver nanowires. The packaging device may also include a thermochromic ink on the outer layer. The heating element layer may be configured to be activated multiple times when supplied with the electrical power multiple times. The packaging device may also include heat-activated expanding foam disposed between the inner and outer layers. In some embodiments, the heat-activated expanding foam comprises thermoplastic beads containing low boiling point hydrocarbon.

In another aspect, this disclosure is directed to an article for incorporation with, or attachment to, clothing. The article can include a substrate; a thermochromic ink on the substrate; and a heating element thermally coupled to the substrate. The heating element layer is biodegradable and provides resistive heating to the thermochromic ink when supplied with electrical power from a power source.

Such an article for incorporation with, or attachment to, clothing may optionally include one or more of the following features. The article may be electroluminescent or may include an electroluminescent element.

In another aspect, this disclosure is directed to a fully decomposable wirelessly-powered pressure sensor comprising one or more leaf skeletons. In some embodiments, the one or more leaf skeletons are coated with silver nanowires.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 1 is a perspective view of an example packaging device that includes an integrated heating system in accordance with some embodiments.

FIG. 2 is a cross-sectional view of the packaging device of FIG. 1 taken along the cutting plane line 2-2.

FIG. 2A is an example enlarged cross-sectional view of a layer of the packaging device of FIG. 1.

FIG. 2B is example enlarged cross-sectional view of another layer of the packaging device of FIG. 1 (at the opening of the packaging device).

Like reference symbols in the various drawings indicate like elements.

DETAILED DESCRIPTION

Figure 3:
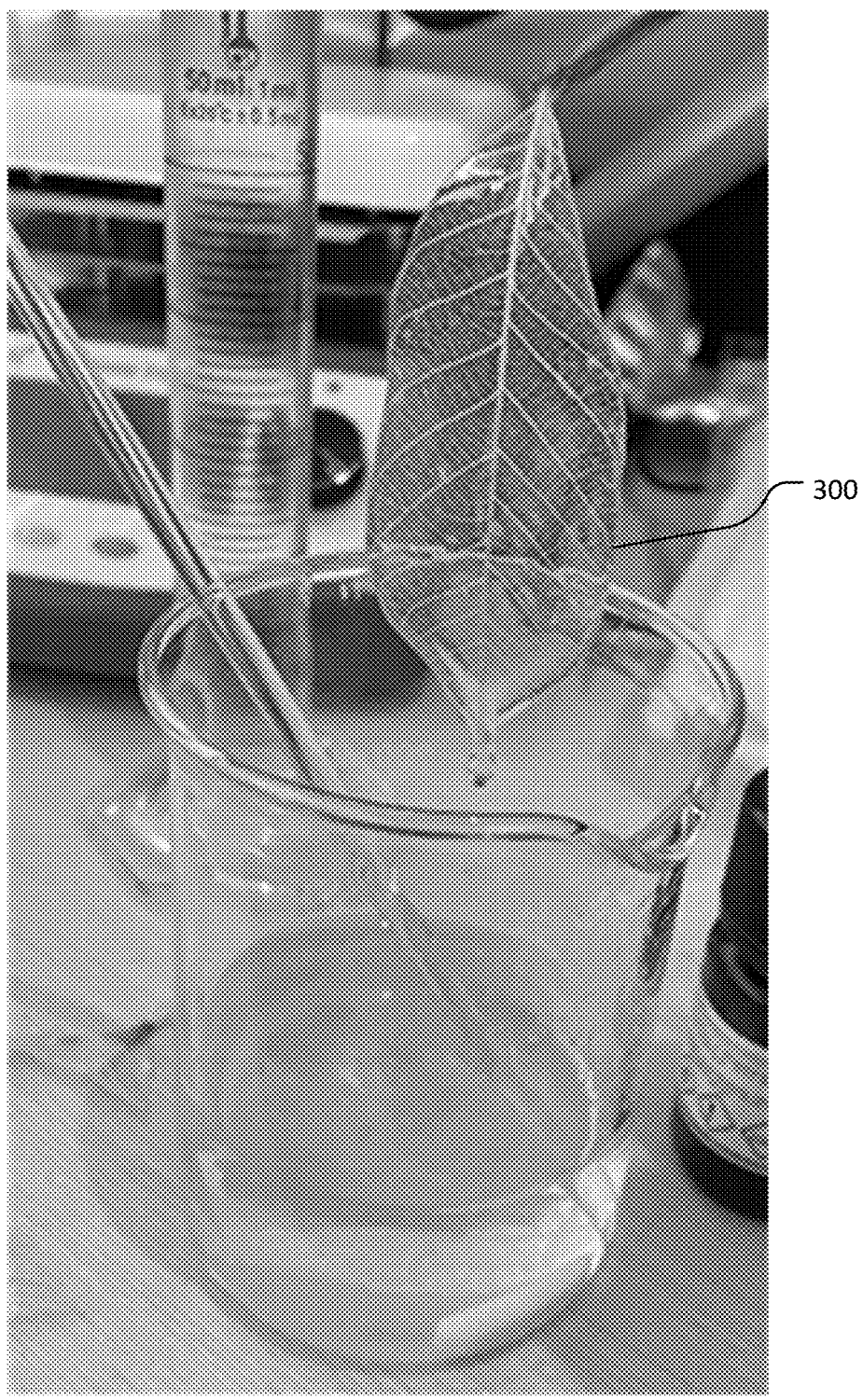
FIG. 3 is a photograph showing an example leaf skeleton being processed to make the leaf skeleton electrically conductive.

As described further below, this innovation uses fibrous natural materials (e.g., leaf skeletons and soft biomaterials like chitosan) along with silver nanowires to create completely biodegradable, and reusable self-heating packaging. An advantage of using flexible biomaterials over traditional self-heating solutions in packaging include reduced bulkiness and weight, flexible form factors that conform to packaging contents to save space, and lower environmental footprints. Silver traces may be patterned as a coil to allow the packaging to heat via Joule heating (resistive heating) when brought near standard wireless charging coils, or the packaging may be directly plugged into a wall outlet or portable battery bank. This new decomposable system is capable of wirelessly heating to >70° C., is flexible, lightweight, low-cost, and reusable, and it maintains its functionality over long periods of heating and multiple power cycles.

The packaging devices described herein can be used to heat food and cosmetic products without having to remove the contents and transferring them to an external heater. Additionally, the packaging devices described herein can be coated with thermo-responsive inks to indicate the temperature to the user or to enable interactivity with the package. Moreover, by using other biomaterials like beeswax on the inner linings of the package that fuse together on heating, the self-heating element can also allow for self-resealing packages.

While the innovative concepts described herein are primarily described in the context of self-heating packaging, it should be understood that other implementations that are "semi-permanent' and decomposable at home are also envisioned. As described further below, such additional implementations can include, but are not limited to, on-body therapy pads and other wearables such as thermo-responsive clothing, heat-activated shape-changing materials, and pressure sensors, to provide a few examples.

Referring to FIG. 1, an example packaging device 100 can be used to contain a product 200. The product 200 represents any type(s) of item or items that be removably contained within the interior of the packaging device 100. For example, the product 200 can be, without limitation, single-serving meals, drinks, massage oils, masks, body wax, anti-wrinkle eye creams, and the like.

In some embodiments, the packaging device 100 can be flexible. Alternatively, in some embodiments the packaging device 100 can be rigid. The packaging device 100 can be reusable. The packaging device 100 can be made of materials that are biodegradable.

FIG. 2 shows a cross-sectional view of the packaging device 100. FIGS. 2A and 2B show enlarged views of the wall 101 of the packaging device 100.

In FIG. 2A, it can be seen that the wall 101 is constructed of multiple layers. For example, in some embodiments the wall is comprised of an inner layer 102, a heating element layer 104, an outer layer 106, and a temperature indicator 108.

In some embodiments, the inner layer 102 and the outer layer 106 are made of a biodegradable material, such as chitosan, which forms the body of the packaging device 100.

The heating element layer 104 is encapsulated on both sides by the inner layer 102 and the outer layer 106. In some embodiments, the heating element layer 104 is made of electrically conductive biodegradable materials, as described further below.

The temperature indicator 108 can be thermochromic inks or other temperature-sensitive visual elements. For example, the temperature indicator 108 may change color or appearance to indicate when the product 200 is heated. In some embodiments, the thermochromic pigment can be mixed with a non-toxic, water-based glue and printed, stenciled, or brushed onto the outer layer 106. In some cases, the temperature indicator 108 can be printed in a decorative pattern.

In FIG. 2B, it can be seen that a seal layer 110 is located on the interior side of the inner layer 102. The seal layer 110 is located adjacent to the opening of the packaging device 100. In some embodiments, the seal layer 110 extends along the entire periphery of the opening (on both sides of the opening). In some embodiments, the seal layer 110 extends along just one side of the opening.

In some embodiments, the seal layer 110 is a material that melts or becomes sticky when heated. For example, in some embodiments the seal layer 110 is made of beeswax (without limitation). Accordingly, when the seal layer 110 is heated by the heating element layer 104 the seal is activated such that the opening to the packaging device 100 can be sealed shut.

Figure 4:
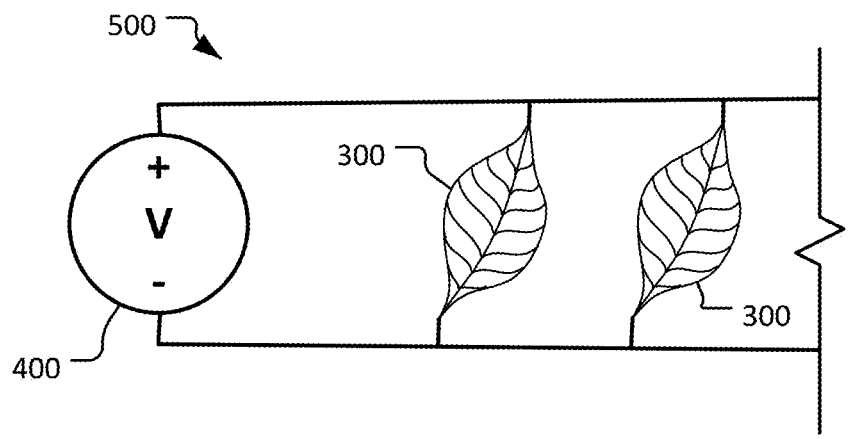
FIG. 4 is a schematic illustration of an example electrical circuit that can be used for the heating system of the packaging device of FIG. 1.

FIGS. 3 and 4 provide examples of one type of construction of the heating element layer 104 which is configured for Joule heating (resistive heating). It should be understood that in some embodiments the materials that make up the heating element layer 104 are biodegradable. For example, in some embodiments the heating element layer 104 is made of fibrous natural materials. In this example, the heating element layer 104 is made of leaf skeletons 300 that serve as the heater substrates.

To prepare the leaf skeletons to serve as the electrically conductive heater substrates, various processes can be used. In one example, a chitosan solution is prepared by diluting acetic acid deionized water at 2% vol. Medium molecular weight deacetylated chitosan is added to the acetic acid solution at a 1 wt % concentration and is continuously stirred for 1 hour on a hotplate heated to 60 C. Glycerol is then added to the solution as a plasticizer, with a weight ratio of about 0.33:1 or about 0.4:1 glycerol:chitosan. The solution is stirred at 60 C for an additional 30 minutes. The solution is then left to cool at room temperature.

Lastly, the leaf skeletons 300 are dipped into the chitosan solution (as illustrated in FIG. 3). Chitosan acts to stabilize the leaf skeletons 300 while they are heated. In some embodiments, the leaf skeletons 300 are leaves that have been boiled in a washing soda solution to remove all but the hollow vein structure of the leaves. The leaf skeletons 300 provide underlying texture and pattern for the silver nanowires to adhere to, as described further below.

After dipping, the leaf skeletons 300 can be hung to dry at room temperature for about 2 to 4 hours. Subsequently, as an optional step, the leaf skeletons 300 can be dipped in a solution of 11-aminounde-canoic acid in water (0.14 wt %) to increase the adhesion of silver nanowires in the next step.

The leaf skeletons 300 are dried and then dipped into a solution of silver nanowires. In some embodiments, the silver nanowires are suspended in ethanol with a nanowire concentration of about 0.5 mg/mL for about 20 seconds. This provides a thin coating of the silver nanowires over the substrate. The coated leaf skeletons 300 are then allowed to dry for at least 10 minutes. In some embodiments, the dimensions of the silver nanowires are about 35+/−5 nm in diameter by 25 μm+/−5 μm in length. Other geometries may also be used. Moreover, in some embodiments other types of materials such as carbon nanotubes, iron, magnesium, or conductive polymers such as PEDOT can be used to make electrically conductive elements, while also being readily biodegradable into non-toxic particles. Pre-treatment materials for enhancing the adhesion of silver nanowires to the leaf skeletons 300 can include silver nitrate, 11-Aminoundecanoic acid, Hexadecyltrimethylammonium bromide (CTAB), and Poly-L-lysine, without limitation.

Alternative heating element substrates (other than the leaf skeletons 300) for the biodegradable heating element layer 104 can include, for example: Chitosan stamped with a textured sheet (such as a leaf or a mesh); Chitosan-covered 3D-printed structures made of a biodegradable material with the same fractal pattern as leaf skeletons; Fibrous materials such as paper, cardboard, fruit or vegetable peels, fabric; Other bioplastics based on biological materials such as agar, gelatin, carrageenan, kombucha SCOBY.

The heating element substrates of the heating element layer 104 may be mounted to the inside of the biodegradable packaging device 100 (e.g., between the layers 102 and 106, which can be constructed of chitosan, or cardboard, etc.) using a biodegradable adhesive (e.g., cellophane tape, water-based non-toxic glue, wet chitosan, etc.).

As depicted in the electrical schematic of FIG. 4, for larger packages, multiple heaters (as illustrated here by the treated leaf skeletons 300) may be connected in parallel with non-toxic biodegradable conductive paint, which may be applied by hand with a brush or with an ink-jet printer. This non-toxic biodegradable conductive paint can also be patterned into a coil at selective locations on the package, as described further below. Such coils can provide an inductive power transfer functionality to the packaging device 100. Materials for making the biodegradable, conductive traces needed to connect heating elements and to form a coil for inductive power transfer can include, for example: graphite; graphene, or other carbon-based paints; nano-copper ink; silver nanoparticles; silver nanowires; metal oxides, water-based silver ink, or PEDOT:PSS.

As depicted in the electrical schematic of FIG. 4, in some embodiments the electrical circuit 500 includes an onboard battery 400 (e.g., 0-5 volts) that is used to power one or more heaters (as illustrated here by the treated leaf skeletons 300). In some embodiments of the packaging device 100, as an alternative to the onboard battery 400, the packaging device 100 simply includes electrical connectors for connection to an external power source (e.g., a battery, a solar cell, AC power, etc.).

Figure 5:
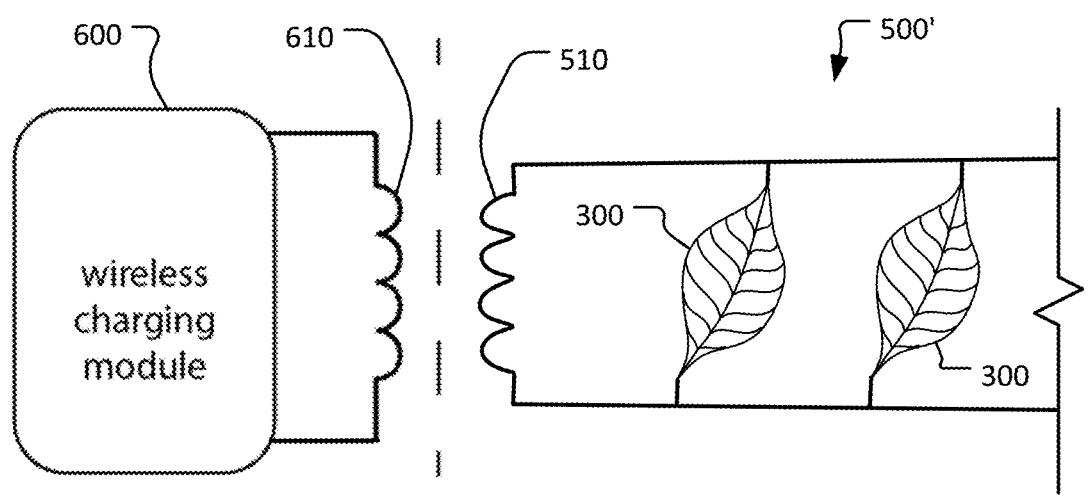
FIG. 5 is a schematic illustration of another example electrical circuit that can be used for the heating system of the packaging device of FIG. 1.

In other embodiments, such as depicted in FIG. 5, the packaging device 100 can be configured with one or more internal coils 510 that provide wireless inductive power transfer capabilities. That is, electrical circuit 500' of the packaging device 100 can be made compatible with inductive chargers 600 by patterning a coil 510 (e.g., printing the coil) with the same material used to make conductive traces. In such a case, the packaging device 100 can be simply brought into close proximity or physical contact with an inductive charger 600 in order to energize the one or more heaters of the packaging device 100. In some embodiments, some mobile phones can function as such an inductive charger 600.

In some embodiments, chitosan can be printed into the pattern of the coil 510. The design of the coil 510 can be tuned to the transfer frequency and a thicker layer of silver nanowires can be deposited to receive the power signal, increasing conductance of the nanowire assemblies to enable the coil 510 to operate as an antenna. Chitosan can be printed with an ink-jet printer, microfluidics or other methods.

Still referring to FIG. 5, the amount of power delivered to the treated leaf skeletons 300, and thus the amount of heat generated by the treated leaf skeletons 300, may intentionally be varied by adjusting the position of the receiving coil 510 on the packaging 100 relative to the transmitting coil 610 of the wireless charging module 600. When the coils 510 and 610 are aligned on top of each other with virtually no spacing between them, the treated leaf skeletons 300 can achieve maximum heating. To achieve lower temperatures, the package 100 may be moved side to side or elevated above the charging module 600.

Additional Implementations and Optional Features

The pasteurization of milk requires a sustained temperature of 63° C. for 15 minutes or 72° C. for 15 seconds to sufficient to destroy all yeasts, molds, and gram-negative bacteria. These parameters are easily achievable by the packaging device 100, positioning them as an attractive solution for food safety in environments and locales where specialized equipment is unavailable.

The packaging device 100 may also be used as a reusable bag for heating food for more optimal enjoyment. In one such example, cookies and/or other snacks or beverages can be warmed using the packaging device 100. Moreover, the packaging device 100 can utilized in various settings, such as outdoors on a hike or in an airport, where microwaves and other kitchen appliances are not readily available, or in situations in which it might not be desirable to share such equipment.

4D printing and shape-morphing materials are active research areas that promise to revolutionize many fields such as manufacturing, shipping, implantable devices, and tangible user interfaces. Small, lightweight, and eco-friendly heaters such as the packaging device 100 could be used to make such demonstrations portable, perhaps opening the door for more applications. That is, one or more of the heating devices as described herein can be attached to the shape-morphing materials to enable heat-induced shape change. Heaters can be selectively attached and/or selectively activated to different areas the shape-morphing materials to control deformation.

Additionally, shape-changing materials could be also integrated into a packaging form factor to indicate prior usage (e.g., perhaps decoratively or perhaps as a safety feature). For instance, by varying print speed and direction, a 3D printer may be used to print objects that are flat when printed, but upon heating, they morph into 3D forms as specified by the designer. In one example, these shape-morphing materials could be integrated onto the outside of packaging device 100 such that its shape indicates if the package device 100 has been heated before.

Heat-activated shape-changing materials such as expanding foams made from silicone and thermally-expanding microspheres can also be incorporated into the package device 100 to protect arbitrarily-shaped contents. The unexpanded foam can be packed flat into the walls of the package device 100 to allow for easy transport when the packaging is empty. Once the package device 100 is filled, the expanding foam can be easily heat-activated to inflate and conform to the contents by placing the package device 100 on an inductive charging mat, for example. In some examples, such expanding foams can be in the form of microspheres (~40 μm diameter) or tiny thermoplastic beads containing low boiling point hydrocarbon inside. When headed, such expanding foams can expand up to 60× their original volume.

There are several cosmetic and personal health products that the package device 100 can also enable and improve the experience of using. For instance, waxing strips must be warmed before they are able to adhere to skin. Other items that need to be heated for an optimal user experience include lotions and essential oils.

Beyond being integrated into packaging for such on-body products, the inventive concepts of the package device 100 can be applied as semi-permanent on-body wearables. One example implementation is as a stand-alone heat therapy patch. The inventive concepts of the package device 100 may also be used to activate thermo-responsive designs on clothing (e.g., fully decomposable, electroluminescent patches sewn into or adhered to the clothing fabric).

Additionally, inventive concepts of the package device 100 may be implemented in the context of interactive wearable designs that require heat to activate, but include properties like the shape-changing interfaces described above. In another example, a hydrogel-based wearable can program mably change texture based on temperature. The inventive concepts of the package device 100 may be used to provide the temperature modulation.

In another example implementation, color-changing wall art can be implemented using the inventive concepts of the package device 100.

Fully biodegradable batteries are also envisioned as a way to enable even more applications of decomposable interfaces in environments where wireless power might not be a feasible option.

The branching fractal structure of the leaf skeletons as described above is also promising for pressure sensing. A very similar design approach to what is described above can be applied to create a fully decomposable wirelessly-powered system for pressure sensing implementations.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A packaging device comprising:
    a multi-layer material configured to define an interior space and an opening to the interior space, wherein at least a portion of the multi-layer material comprises:
        an inner layer made of a first biodegradable material;
        an outer layer made of a second biodegradable material;
        a heat-activated expanding foam disposed between the inner layer and the outer layer, wherein the heat-activated expanding foam comprises thermoplastic beads containing low boiling point hydrocarbon; and
        a heating element layer encapsulated between the inner and outer layers, wherein the heating element layer is biodegradable and provides resistive heating to the interior space when supplied with electrical power from a power source; and
    a coil electrically connected to the heating element layer and configured for inductively coupling with an external power source to provide the electrical power to the heating element layer.

2. The packaging device of claim 1, further comprising a seal material disposed adjacent to the opening, wherein the seal material is configured to activate in response to heating from the heating element layer and to provide sealing of the opening.

3. The packaging device of claim 1, wherein the power source is an onboard battery electrically connected to the heating element layer.

4. The packaging device of claim 1, wherein the coil comprises chitosan and sliver nanowires.

5. The packaging device of claim 1, wherein the coil comprises a printed biodegradable electrically-conductive ink.

6. The packaging device of claim 1, wherein an entirety of the packaging device is biodegradable.

7. The packaging device of claim 1, wherein the heating element layer comprises one or more leaf skeletons.

8. The packaging device of claim 7, wherein the one or more leaf skeletons are coated with silver nanowires.

9. The packaging device of claim 1, further comprising a thermochromic ink on the outer layer.

10. The packaging device of claim 1, wherein the heating element layer is configured to be activated multiple times when supplied with the electrical power multiple times.

11. An article comprising:
a substrate;
a thermochromic ink on the substrate;
a heating element thermally coupled to the substrate, wherein the heating element biodegradable and provides resistive heating to the thermochromic ink when supplied with electrical power from a power source; and
a coil electrically connected to the heating element layer and configured for inductively coupling with an external power source to provide the electrical power to the heating element layer, wherein
the article is configured to be incorporated with, or attached to, a clothing.

12. The article of claim 11, wherein the article is electroluminescent or further comprises an electroluminescent element.

* * * * *